Figure 1:
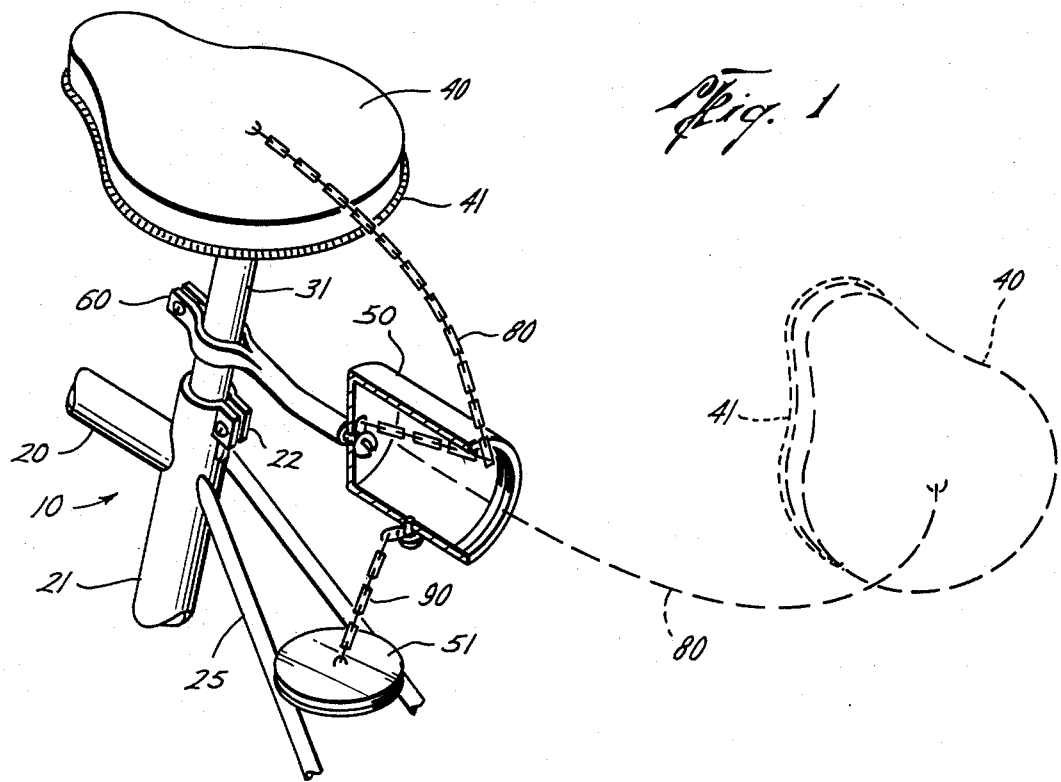

United States Patent [19]
Mize

[11] 3,972,539
[45] Aug. 3, 1976

[54] BICYCLE SEAT COVERING AND RECEPTACLE THEREFOR

[76] Inventor: Timothy I. Mize, 150 NE. 12th St., Moore, Okla. 73160

[22] Filed: Sept. 22, 1975

[21] Appl. No.: 615,765

[52] U.S. Cl............................ 280/289 S; 296/78.1; 297/184
[51] Int. Cl.² ........................................ B62J 19/00
[58] Field of Search .................... 280/289 R, 289 S; 296/78.1, 136; 160/19; 2/1, 2; 297/184

[56] References Cited
UNITED STATES PATENTS

| | | | |
|---|---|---|---|
| 2,892,577 | 6/1959 | Chew | 280/289 R |
| 3,665,515 | 5/1972 | Sjostrom | 296/78.1 |
| 3,884,523 | 5/1975 | Allen | 296/136 |

FOREIGN PATENTS OR APPLICATIONS

| | | | |
|---|---|---|---|
| 61,928 | 1/1944 | Denmark | 297/184 |
| 83,816 | 1/1957 | Netherlands | 280/289 S |
| 119,395 | 7/1947 | Sweden | 297/184 |
| 375,243 | 3/1964 | Switzerland | 280/289 S |
| 221,145 | 5/1942 | Switzerland | 280/289 S |
| 220,872 | 8/1924 | United Kingdom | 296/78.1 |
| 2,299 | 1906 | United Kingdom | 296/78.1 |
| 196,025 | 4/1923 | United Kingdom | 296/78.1 |
| 206,225 | 11/1923 | United Kingdom | 297/184 |
| 214,016 | 4/1924 | United Kingdom | 297/184 |
| 25,938 | 1909 | United Kingdom | 297/184 |
| 23,128 | 1908 | United Kingdom | 297/184 |

*Primary Examiner*—M. H. Wood, Jr.
*Assistant Examiner*—Jack D. Rubenstein
*Attorney, Agent, or Firm*—J. Bruce Synnott, Jr.

[57] ABSTRACT

In combination with a bicycle having a frame, and having a seat mounted on a seat post which is removably and adjustably connected to the frame, the combination of a seat covering, for keeping the seat clean and dry when not in use, and a receptacle for the seat covering having the covering received bodily therein when not in use. The seat covering is formed of flexible non-elastic water proof sheet material and shaped to conform to the contour of the seat, and has elastic means acting on the material of the covering to gather it, along its peripheral edge, to secure the covering in engagement with the seat. The material of the covering is such that it may be rolled or folded, for storage in small space. The receptacle consists of a cylindrical container, open at one end and having a screw cap therefor, which is rigidly and removably connected to the bicycle structure and positioned rearwardly of the seat and below it, with its open end facing rearwardly for convenient access to its interior.

4 Claims, 2 Drawing Figures

U.S. Patent  Aug. 3, 1976  3,972,539

BICYCLE SEAT COVERING AND RECEPTACLE THEREFOR

This invention relates to a BICYCLE SEAT COVERING AND RECEPTACLE THEREFOR, and it concerns more particularly, in combination with a bicycle having a frame, and having a seat mounted on a seat post which is removably and adjustably connected to the frame, the combination of a seat covering, for keeping the seat clean and dry when not in use, and a receptacle for the seat covering having the covering received bodily therein when not in use.

The seat covering is formed of flexible non-elastic water proof sheet material and shaped to conform to the contour of the seat, and has elastic means acting on the material of the covering to gather it, along its peripheral edge, to secure the covering in engagement with the seat. The material of the covering is such that it may be rolled or folded, for storage in small space.

The receptacle consists of a cylindrical container, open at one end and having a screw cap therefor, which is rigidly and removably connected to the bicycle structure and positioned rearwardly of the seat and below it, with its open end facing rearwardly for convenient access to its interior.

The frame includes a seat tube in which the seat post is received telescopically and having clamp means whereby the seat post is secured in its adjusted position relative to the seat tube, so that in effect the seat post is an upward extension of the seat tube. In one form thereof the receptacle has clamp means whereby it is rigidly and removably connected to the seat post. Alternatively, the receptacle may be connected to the frame of the bicycle.

The frame has a bifurcated seat stay, the elements of which straddle the rear wheel of the bicycle and are joined at their upper ends to the seat tube near its upper end, and in one form thereof the receptacle has clamp means whereby it is rigidly and removably connected to the elements of the seat stay.

The exposed side of the screw cap, which in use faces rearwardly, has a reflective surface, useful as a safety device.

The invention further includes a first chain connected at its ends to the bottom of the receptacle, on the inside thereof, and to the exposed side of the seat covering, to prevent accidental loss or misplacement of the covering and to insure that it is always available and in good condition, ready for instant use, and a second chain connected at its ends to the under side of the receptacle, near its open end, and to the exposed side of the screw cap, to prevent accidental loss or misplacement of the cap.

Figure 2:
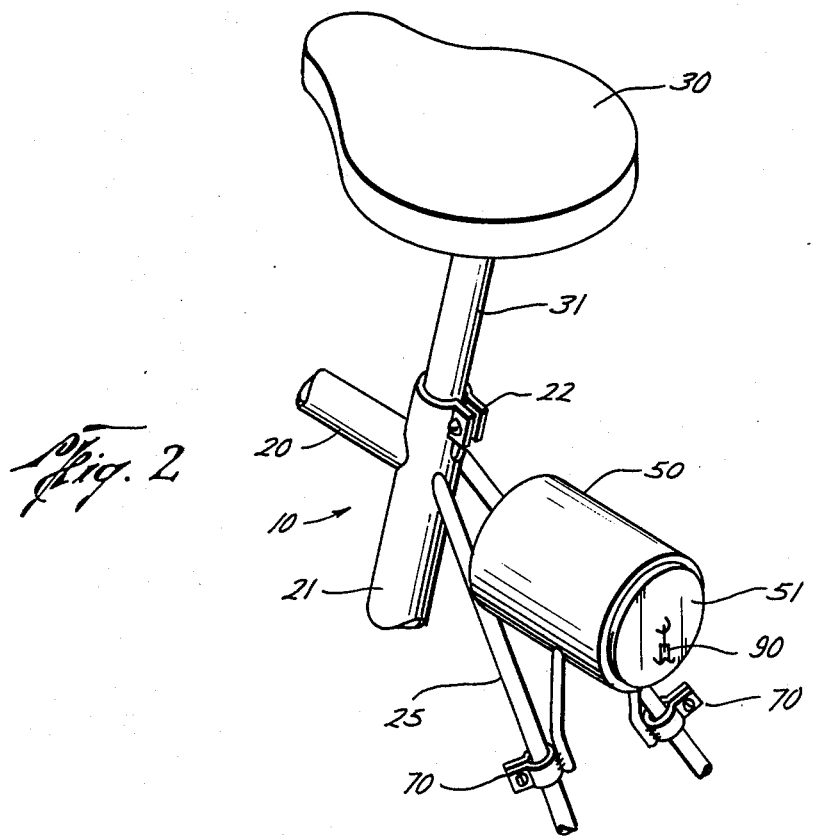

The invention will be readily understood by referring to the following description and the accompanying drawing, in which:

FIG. 1 shows the invention as applied to a bicycle, shown fragmentarily, showing one form of the invention in which the receptacle has clamp means whereby it is rigidly and removably connected to the seat post of the bicycle and showing the invention in its several operative positions; and FIG. 2 is a view similar to FIG. 1 showing another form of the invention in which the receptacle has clamp means whereby it is rigidly and removably connected to the frame of the bicycle.

Referring to the drawing, the numeral 10 designates generally a bicycle, shown fragmentarily, which is of usual construction and has a frame as hereinafter described, indicated generally by the numeral 20, and has a seat 30 mounted on a seat post 31 which is removably and adjustably connected to the frame 20.

The invention includes a seat covering, indicated generally by the numeral 40, for keeping the seat 30 clean and dry when not in use, and a receptacle for the seat covering 40, indicated generally by the numeral 50, which has the covering 40 received bodily therein when not in use.

The seat covering 40 is formed of flexible non-elastic water proof sheet material and shaped to conform to the contour of the seat 30, and has elastic means 41 acting on the material of the covering 40 to gather it, along its peripheral edge, to secure the covering 40 in engagement with the seat 30. The material of the covering 40 is such that it may be rolled or folded, for storage in small space.

The receptacle 50 consists of a cylindrical container, open at one end and having a screw cap therefor, indicated by the numeral 51, which is rigidly and removably connected to the bicycle structure which includes the seat post 31 and the frame 20, as described, and positioned rearwardly of the seat 30 and below it, with its open end facing rearwardly for convenient access to its interior.

The frame 20 includes a seat tube 21 in which the seat post 31 is received telescopically and has clamp means 22 whereby the seat post 31 is secured in its adjusted position relative to the seat tube 21, so that in effect the seat post 31 is an upward extension of the seat tube 21.

In one form of the invention, shown in FIG. 1 of the drawing, the receptacle 50 has clamp means, indicated generally by the numeral 60, whereby it is rigidly and removably connected to the seat post 31. Alternatively, the receptacle 50 may be connected to the frame 20 as hereinafter described.

The frame 20 has a bifurcated seat stay 25, the elements of which straddle the rear wheel of the bicycle 10 and are joined at their upper ends to the seat tube 21 near its upper end.

In one form of the invention, shown in FIG. 2 of the drawing, the receptacle 50 has clamp means, indicated generally by the numeral 70, which corresponds to the clamp means 60 shown in FIG. 1, whereby it is rigidly and removably connected to the elements of the seat stay 25.

The exposed side of the screw cap 51, which in use faces rearwardly, has a reflective surface, useful as a safety device.

A first chain, indicated generally by the numeral 80, is connected at its ends to the bottom of the receptacle 50, on the inside thereof, and to the exposed side of the seat covering 40, to prevent accidental loss or misplacement of the covering 40 and to insure that it is always available and in good condition, ready for instant use.

A second chain, indicated generally by the numeral 90, is connected at its ends to the under side of the receptacle 50, near its open end, and to the exposed side of the screw cap 51, to prevent accidental loss or misplacement of the cap 51.

I claim:

1. In combination with a bicycle having a frame, and having a seat mounted on a seat post which is removably and adjustably connected to the frame, the combination of a seat covering, for keeping the seat clean and dry when not in use, and a receptacle for the seat covering having the covering received bodily therein when not in use, the seat covering being formed of flexible non-elastic water proof sheet material and shaped to conform to the contour of the seat, and having elastic means acting on the material of the covering to gather it, along its peripheral edge, to secure the covering in engagement with the seat, the material of the covering being such that it may be rolled or folded, for storage in small space, and the receptacle consisting of a cylindrical container, open at one end and having a screw cap therefor, which is rigidly and removably connected to the bicycle structure which includes the seat post and the frame, as described, and positioned rearwardly of the seat and below it, with its open end facing rearwardly for convenient access to its interior.

2. The structure of claim 1, the frame including a seat tube in which the seat post is received telescopically and having clamp means whereby the seat post is secured in its adjusted position relative to the seat tube, so that in effect the seat post is an upward extension of the seat tube, and the receptacle having clamp means whereby it is rigidly and removably connected to the seat post.

3. The structure of claim 1, the frame having a bifurcated seat stay, the elements of which straddle the rear wheel of the bicycle and are joined at their upper ends to the seat tube near its upper end, and the receptacle having clamp means whereby it is rigidly and removably connected to the elements of the seat stay.

4. The structure of claim 1, the exposed side of the screw cap, which in use faces rearwardly, having a reflective surface, useful as a safety device, flexible linkage connected to the bottom of the receptacle, on the inside thereof, and to the exposed side of the seat covering, to prevent accidental loss or misplacement of the covering and to insure that it is always available and in good condition, ready for instant use, and other flexible linkage connected to the under side of the receptacle, near its open end, and to the exposed side of the screw cap, to prevent accidental loss or misplacement of the cap.

* * * * *